(12) United States Patent
Housen (10) Patent No.: US 8,033,156 B2
(45) Date of Patent: Oct. 11, 2011

(54) SENSOR APPARATUS AND METHOD FOR DETECTING IMPACTS

(75) Inventor: Kevin R. Housen, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 12/179,768

(22) Filed: Jul. 25, 2008

(65) Prior Publication Data

US 2009/0326835 A1 Dec. 31, 2009

Related U.S. Application Data

(63) Continuation-in-part of application No. 12/145,836, filed on Jun. 25, 2008.

(51) Int. Cl.
*G01L 5/00* (2006.01)
(52) U.S. Cl. ...................................................... 73/11.01
(58) Field of Classification Search .................. 73/11.01
See application file for complete search history.

(56) References Cited

U.S. PATENT DOCUMENTS

| | | | | |
|---|---|---|---|---|
| 3,141,330 | A | * | 7/1964 | Murray et al. .............. 73/170.17 |
| 3,575,641 | A | | 4/1971 | Long |
| 3,582,692 | A | * | 6/1971 | Palini ........................... 310/330 |
| 4,068,133 | A | | 1/1978 | Burwell |
| 4,193,010 | A | | 3/1980 | Kompanek |
| 4,338,575 | A | | 7/1982 | Hartemann |
| 4,394,575 | A | | 7/1983 | Nelson |
| 4,656,333 | A | | 4/1987 | Murphy |
| 4,742,327 | A | | 5/1988 | Burgess et al. |
| 4,904,894 | A | | 2/1990 | Henry et al. |
| 4,984,498 | A | * | 1/1991 | Fishman ........................ 84/730 |
| 5,402,667 | A | * | 4/1995 | Atkinson et al. ............. 73/12.12 |
| 5,455,625 | A | | 10/1995 | Englander |
| 5,661,303 | A | * | 8/1997 | Teder ......................... 250/341.8 |
| 5,712,724 | A | * | 1/1998 | Klocek et al. ................. 359/350 |
| 5,811,680 | A | * | 9/1998 | Galili et al. ..................... 73/579 |
| 7,197,940 | B2 | * | 4/2007 | Ziebart et al. ................... 73/781 |
| 7,249,502 | B2 | * | 7/2007 | Luukkala et al. .......... 73/170.17 |
| 7,331,133 | B2 | | 2/2008 | Bauernfeid |
| 7,479,727 | B1 | * | 1/2009 | Grace ........................... 310/339 |
| 7,575,086 | B2 | | 8/2009 | Kamei et al. |
| 7,733,219 | B2 | * | 6/2010 | Kamei et al. .................. 340/436 |
| 2004/0226386 | A1 | | 11/2004 | Gysling et al. |

OTHER PUBLICATIONS

Hubbert et al., "CSU-CHILL Polarimetric Radar Measurements from a Severe Hail Storm in Eastern Colorado", Journal of Applied Meteorology, vol. 37, Aug. 1998, pp. 749-775.
Reges et al., "The Community Collaborative Rain, Hail and Snow Network (COCORAHS)—"Informal Atmospheric Science in the Community: What can We Accomplish?, retrieved on Apr. 24, 2008.
Gaul et al., "Determination of the impact force on a plate by piezo-electric film sensors", Archive of Applied Mechanics 69 (1999), Springer-Verlag 1999, pp. 691-701.
Kourounis, "Storm Chaser Technology", Dec. 2004 to Jan. 2005. http://web.archive.org/20050101-20041201re_/http://www.stormchaser.ca/Gear.html.
USPTO Office Action for U.S. Appl. No. 12/145,836 dated May 14, 2010.
USPTO Final Office Action for U.S. Appl. No. 12/145,836 dated Feb. 24, 2010.

* cited by examiner

*Primary Examiner* — Lisa Caputo
*Assistant Examiner* — Octavia Davis
(74) *Attorney, Agent, or Firm* — Yee & Associates, P.C.

(57) ABSTRACT

An impact test system for collecting hail storm data comprises a vehicle, a video recorder, a container, a plurality of dynamic force sensors, an atmospheric instrument system, a mounting fixture, and a data processing system. The plurality of dynamic force sensors is capable of detecting force generated by an impact of an object. The plurality of markers is capable of being used to determine an orientation of an incoming object. The mounting fixture is capable of holding a test specimen. The data processing system is capable of collecting data from the plurality of dynamic force sensors, the atmospheric instrument system, and the video recorder.

6 Claims, 7 Drawing Sheets

SENSOR APPARATUS AND METHOD FOR DETECTING IMPACTS

CROSS-REFERENCE TO RELATED APPLICATION

The present invention is a continuation-in-part (CIP) of and claims priority to the following patent application: entitled Test Bed for In-Situ Studies, Ser. No. 12/145,836, filed Jun. 25, 2008, and is incorporated herein by reference.

BACKGROUND INFORMATION

1. Field

The present disclosure relates generally to impact testing and in particular to a method and apparatus for in-situ measurement of impacts caused by hail stones.

2. Background

Hail is a form of precipitation and may include balls or irregular lumps of ice. Hail is also referred to as hail stones. Hail stones may form in clouds when super-cooled water droplets freeze on contact with condensation nuclei, such as dust. Up drafts in the storm may blow or push hail stones to the upper part of the cloud. The hail stones may then fall down when the up draft dissipates. This cycle may occur a number of times with the hail stone, gaining a layer of ice each time the hail stone ascends.

Hail stones may cause damage to a number of different man made objects such as houses, office buildings, cars, trucks, aircraft, and other man made objects. With respect to aircraft, the type of materials, thickness of materials, and other parameters with respect to materials for an exterior portion of the aircraft may include consideration as to how these materials may react when hail stones impact different parts on the aircraft. These parts include, for example, without limitation, a windshield, a wing panel, an aileron, a jet engine inlet, a fuselage, and other suitable exterior components of an aircraft.

In designing these and other components for an aircraft, projections may be made to provide some minimum gauge or thickness to take in to account hail stone impacts on those components. Currently, in identifying minimum thicknesses for components, simulations are used to predict how these components will be affected by impacts caused by hail stones.

One currently used method employs rubber balls to simulate the impact of hail stones. Other currently used methods may simulate hail stone impacts by using a composite ice ball, such as cotton with frozen water. Another approach may use lead or steel balls to simulate hail. These different types of simulations provide some ability to predict the effects of strikes or impacts caused by hail stones. The use of simulated hail stones, such as rubber balls and man made hail stones, provide useful information for designing aircraft parts. These currently used methods are useful, but are only rough simulations of hail stone impacts.

As a result, different designs for aircraft parts may over compensate for the effects of hail stone impacts. Therefore, it would be advantageous to have a method and apparatus that overcomes the problems described above.

SUMMARY

The advantageous embodiments provide a method and apparatus for measuring the impact of an object. In one advantageous embodiment, an apparatus comprises a sensor layer and a base. The sensor layer is capable of generating an electrical signal that varies over time as the force on the sensor layer changes in response to an impact. The base is located under the sensor layer, wherein the base is capable of resisting bending in response to the impact.

In another advantageous embodiment, a dynamic force sensor system comprises a protective layer, a piezo electric film, a base, and a set of walls. The protective layer has a surface and a perimeter. The piezo electric film is located under the protective layer, wherein the piezo electric film generates a signal that is proportional to a force of an impact and wherein the signal varies as the force varies over time. The base is located under the sensor layer, wherein the base is capable of resisting bending in response to the impact. The set of walls surrounds the perimeter of the surface.

In yet another advantageous embodiment, a method is present for measuring force. A signal that varies as the force of the impact varies is generated in response to an impact on a surface of a sensor, wherein the sensor comprises a sensor layer capable of generating the signal and a base under the sensor layer, wherein the base is capable of resisting bending. Force data is generated from the signal.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
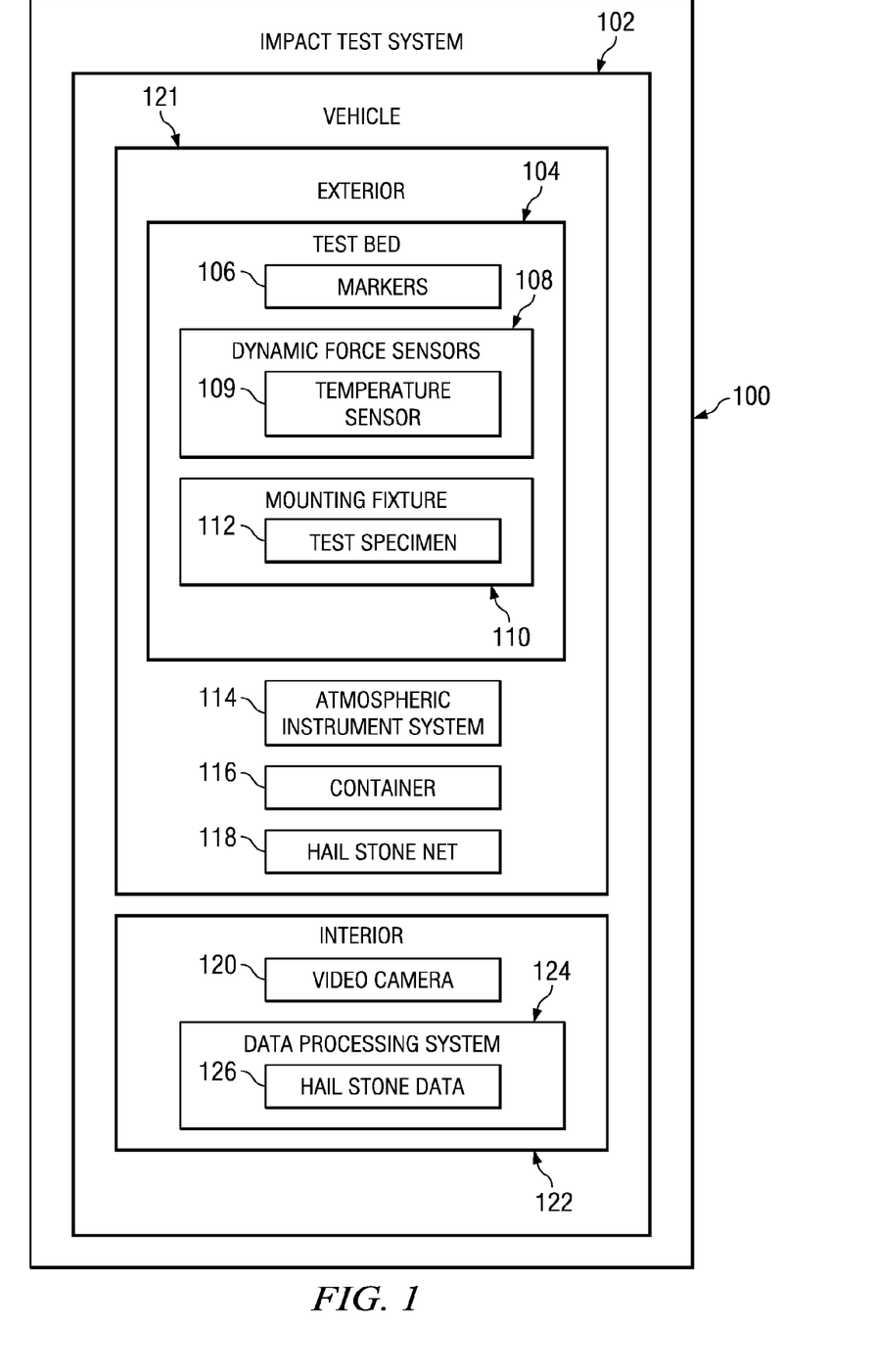
FIG. 1 is a diagram of a impact test system in accordance with an advantageous embodiment.

With reference now to the figures and in particular with reference to FIG. 1, a diagram of an impact test system is depicted in accordance with an advantageous embodiment. Impact test system 100 may be used to collect hail stone data. In particular, impact test system 100 is an example of an in-situ system. In other words, impact test system 100 may collect data about the impact of hail stones in the location of an actual storm in which hail stones are generated and precipitate to impact the ground and other objects.

In this example, impact test system 100 comprises vehicle 102. Vehicle 102 includes test bed 104, markers 106, dynamic force sensors 108, temperature sensor 109, mounting fixture 110, test specimen 112, atmospheric instrument system 114, container 116, hail stone net 118, video camera 120, and data processing system 124, in these examples. Test bed 104, markers 106, dynamic force sensors 108, mounting fixture 110, test specimen 112, atmospheric instrument system 114, container 116, and hail stone net 118 are mounted on exterior 121 of vehicle 102. Video camera 120 and data processing system 124 are located in interior 122 of vehicle 102.

In this illustrative embodiment, markers 106, dynamic force sensors 108, and mounting fixture 110 are located on test bed 104. Test bed 104, in these examples, may be mounted in different locations on vehicle 102. For example, test bed 104 may be located on the hood, the roof, or some other portion of vehicle 102 that provides exposure to hail stones that may fall during a storm. Test bed 104 may be a platform having a planer surface for markers 106, dynamic force sensors 108, and mounting fixture 110.

Markers 106 may also be referred to as yard markers in some implementations. Markers 106 may be used to identify the orientation of incoming hail stones. In these illustrative examples, markers 106 may take the form of lines that form a grid or sections on test bed 104.

Dynamic force sensors 108 are located within and/or among markers 106, in these examples, and may generate measurements of force on a dynamic basis. In other words, a sensor within dynamic force sensors 108 may generate data identifying the amount of force a hail stone generates over time in response to an impact that occurs on dynamic force sensors 108.

Test specimen 112 is mounted and/or connected to mounting fixture 110 in these examples. Test specimen 112 may take various forms. For example, test specimen 112 may be a composite test specimen. As yet another example, test specimen 116 may be a flat composite test specimen and/or a composite structure with contours. In yet other embodiments, test specimen 116 may be, for example, an aluminum panel or structure. These different test specimens may have different gauges or thicknesses to provide data on the effect of hailstorms on test specimen 112.

Atmospheric instrument system 114 contains a set of atmospheric instruments. A set, as used herein, is one or more items. For example, a set of atmospheric instruments is one or more atmospheric instruments. Atmospheric instrument system 114 may generate data about the atmosphere during a hail storm. Atmospheric instrument system 114 may measure parameters such as, for example, temperature, pressure, humidity, wind speed, wind direction, and/or other suitable parameters about the atmosphere.

Container 116 may hold hail stones that have precipitated or fallen. These hail stones may be examined to identify the composition, shape, size, and other parameters about the hail stones. Hail stone net 118 may catch hail stones in a manner that reduces and/or minimizes the damage to the hail stones. In this manner, intact hail stones may be collected and studied.

Video camera 120 may be directed towards test bed 104 in a manner to record video of hail stones that impact on test bed 104. The video of the impact of hail stones may be analyzed to identify speed and orientation or angles at which hail stones impact test bed 104. The orientation may be identified by using markers 106 within the video.

Data processing system 124 may collect data generated by dynamic force sensors 108, atmospheric instrument system 114, and/or video camera 120. This data may be correlated using time stamps, such that the information from different systems may be analyzed. Data processing system 124 saves these measurements as hail stone data 126. This information may then be transmitted for analysis. In other advantageous embodiments, the analysis may be performed by data processing system 124.

The illustration of impact test system 100 is not intended to limit the manner in which impact test systems may be implemented. The different components illustrated and described are functional components and not meant to provide physical or architectural limitations to the manner in which various components may be implemented.

For example, other components may be used in addition to or in place of the one illustrated for impact test system 100. In one illustrative example, temperature sensor 109 also may be included in impact test system 100. Temperature sensor 109 may be located on or integrated into dynamic force sensors 108. In this manner, information about the temperature of hail stones that impact dynamic force sensors 108 also may be collected.

Container 116, in some implementations, may be located on test bed 104. In yet other advantageous embodiments, mounting fixture 110 may be located on another portion of exterior 121 other than test bed 104. In still other advantageous embodiments, multiple mounting fixtures may be used or mounting fixture 110 may be capable of holding multiple test specimens. In the advantageous embodiments, vehicle 102 may take various forms. For example, vehicle 102 may be a truck, a utility vehicle, a van, a boat, an aircraft, or some other suitable vehicle.

Test impact system 100 in other embodiments may use an un-powered vehicle, such as a trailer. When vehicle 102 takes the form of a trailer, the trailer may be towed by another vehicle into a storm or other area near a storm and left to collect data. In other advantageous embodiments, impact test system 100 may be positioned in a location without any association with a vehicle.

Figure 2:
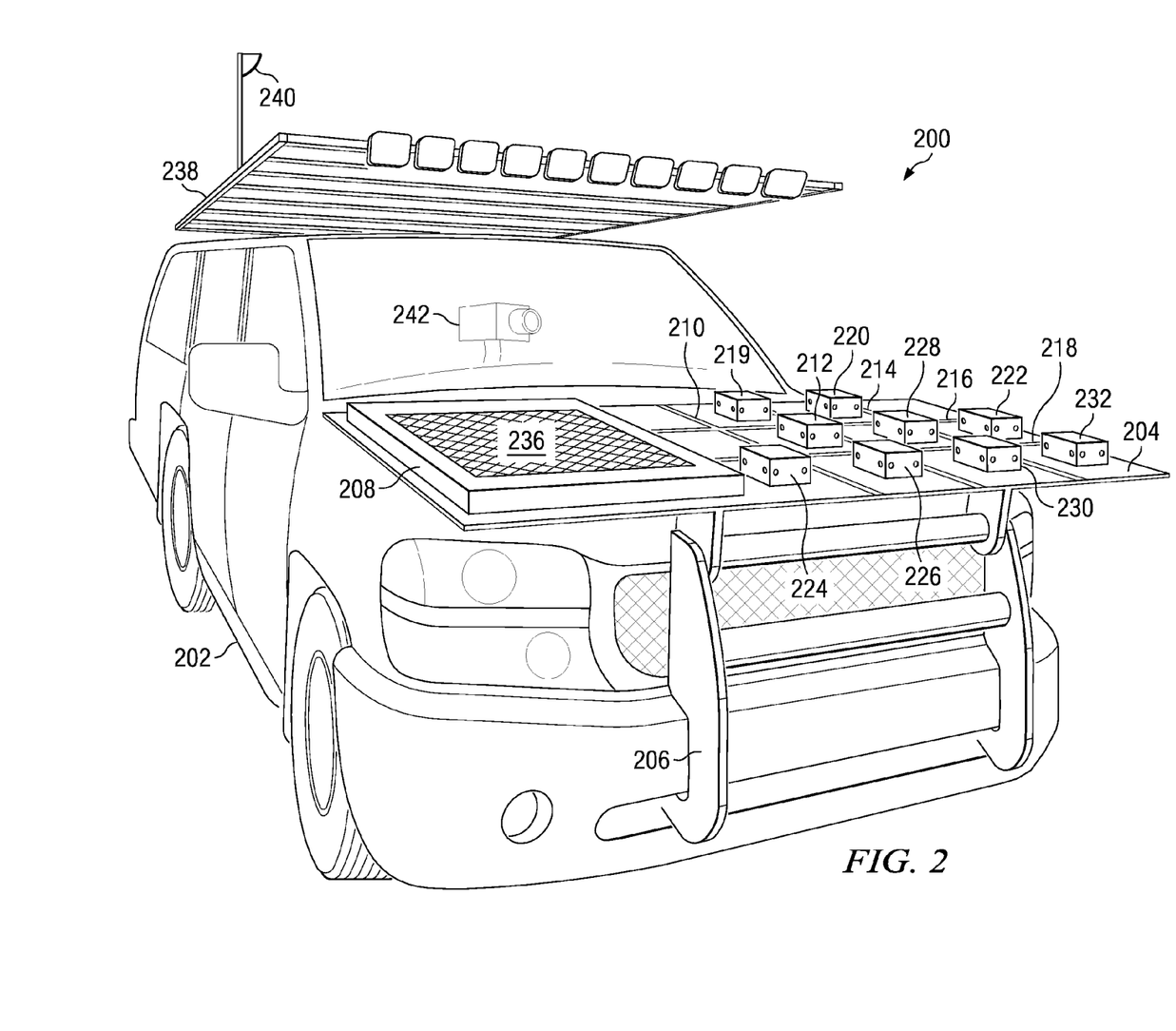
FIG. 2 is a diagram illustrating an impact test system in accordance with an advantageous embodiment.

With reference now to FIG. 2, a diagram illustrating an impact test system is depicted in accordance with an advantageous embodiment. In this example, impact test system 200 is an example of one implementation or embodiment of impact test system 100 in FIG. 1.

In this example, impact test system 200 includes vehicle 202, which takes the form of a utility vehicle. As illustrated, test bed 204 in mounted on hood 206 of vehicle 202. In this particular example, mounting fixture 208 is located on test bed 204. Markers 210, 212, 214, 216, and 218 also are present on test bed 204, in this example. As illustrated, these markers form a grid on test bed 204. Dynamic force sensors 219, 220, 222, 224, 226, 228, 230, and 232 are mounted on test bed 204 within markers 210, 212, 214, 216, and 218.

In this particular example, test specimen 236 takes the form of a composite, flat, honeycombed panel. Of course, test specimen 236 may take other forms. For example, test specimen 236 may be a curve laminate, roofing material, or some other suitable specimen. Impact test system 100 also includes atmospheric instrument system 238 as well as hail catcher 240. In this example, hail catcher 240 is located on the rear of vehicle 202.

As can be seen, in this illustrated example, video camera 242 is located within the interior of vehicle 202. Vehicle 202 also may include a data processing system, which is not shown in this example.

This illustration of impact test system 200 is provided as an example of one manner in which an impact test system may be implemented. This example is not meant to limit the manner in which other impact test systems may be constructed. For example, in other advantageous embodiments, test bed 204 may be located on the rear of vehicle 202. In yet other embodiments, vehicle 202 may take other forms. For example, vehicle 202 may be a pickup truck, a bus, a helicopter, or some other suitable vehicle.

Figure 3:
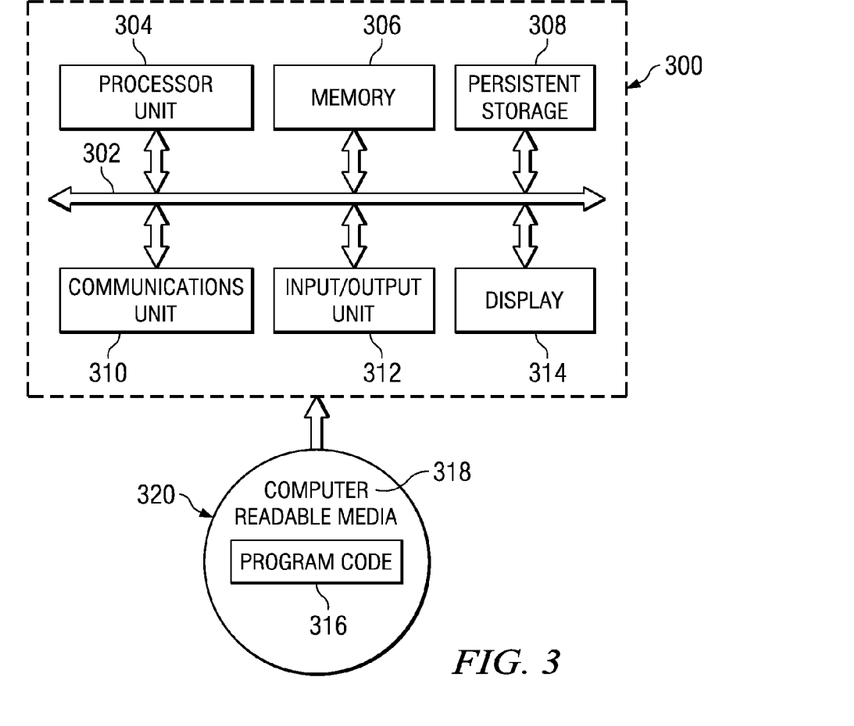
FIG. 3 is a diagram of a data processing system in accordance with an advantageous embodiment.

Turning now to FIG. 3, a diagram of a data processing system is depicted in accordance with an advantageous embodiment. Data processing system 300 is an example of data processing system 124 in FIG. 1. Data processing system 300 may be used to collect the data gathered from various sensors and instruments located within impact test system 100 in FIG. 1. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices.

For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. Input/output unit 312 may be connected to devices such as, for example, dynamic force sensors 108, atmospheric instrument system 114, video camera 120, and other suitable devices in impact test system 100 in FIG. 1. Input/output unit 312 also may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

Figure 4:
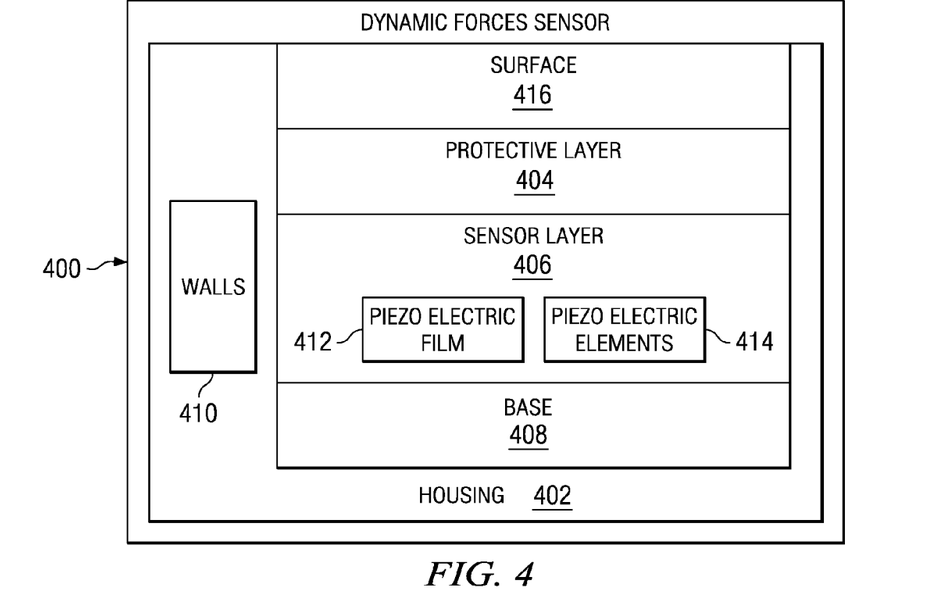
FIG. 4 is a block diagram of a dynamic force sensor in accordance with an advantageous embodiment.

With reference now to FIG. 4, a block diagram of a dynamic force sensor is depicted in accordance with an advantageous embodiment. Dynamic force sensor 400 is an example of a dynamic force sensor that may be used to implement a dynamic force sensor in dynamic force sensors 108 in FIG. 1. In this example, dynamic force sensor 400 takes the form of a piezo electric force transducer.

Dynamic force sensor 400 includes housing 402. Housing 402 contains protective layer 404, sensor layer 406, and base 408 in this illustrative example. Protective layer 404 is located over sensor layer 406. Base 408 is located below sensor layer 406. Of course, other layers may be present between the illustrated layers in these depicted examples. Housing 402 also may include walls 410, which may be placed around base 408.

Base 408 provides a platform for piezo electric film 412 and piezo electric elements 414 within sensor layer 406. In these examples, base 408 is comprised of a material that has sufficient stiffness and/or rigidity to minimize or resist bending when dynamic force sensor 400 is hit or impacted by an object. By avoiding bending, spurious signals caused by in-plane bending motions may be avoided. In this manner, only the force of the impact may be depicted by avoiding other types of data that may be generated from any bending by piezo electric film 412 or piezo electric elements 414 within sensor layer 406.

Piezo electric film 412 and piezo electric elements 414 may be located in layers or sub-layers within sensor layer 406. Piezo electric elements 414 is a set of elements in these examples.

Protective layer 404 provides surface 416 to receive impacts from objects such as, for example, hail stones. These impacts may transfer force to piezo electric film 412 and/or one or more elements in piezo electric elements 414 within sensor layer 406.

An impact on surface 416 of protective layer 404 may cause sensor layer 406 to generate an electrical signal. This signal may be proportional to the force generated by the impact. In these examples, this signal varies over time as the force varies over time.

The signals generated by piezo electric film 412 may be used to calculate or identify the force of an impact of an object on surface 416. The signals generated by piezo electric elements 414 may be used to identify the pressure at certain locations on surface 416. In this manner, these piezo electric elements may be used to identify force at different locations for areas of protective layer 404. With the identification of force over different areas, an identification of the pressure may be made. With the identification of pressure over different locations within sensor layer 406, an identification of the size of the object causing the impact also can be calculated. In addition, in some advantageous embodiments, the pressure identified over different areas may be used to estimate a shape of an object.

The illustration of dynamic force sensor 400 is presented for purposes of illustrating different features for a dynamic force sensor. This illustration is not meant to imply physical or architectural limitations to the manner in which different advantageous embodiments may be implemented. Other advantageous embodiments may include additional components or omit some illustrated components. Further, the components may be arranged in different configurations depending on the particular implementation.

For example, an adhesive may be used to couple and/or attach piezo electric film 412 to base 408 and protective layer 404. In a similar fashion, adhesive may be used to attach piezo electric elements 414 to protective layer 404 and/or base 408. Further, in some advantageous embodiments, piezo electric elements may be arranged over or under piezo electric film 412.

The arrangement of these elements may be in various forms. For example, piezo electric elements 414 may be arranged in an array or in a grid. Further, in other advantageous embodiments, piezo electric elements 414 may be omitted from dynamic force sensor 400. In yet other advantageous embodiments, another layer of piezo electric film 412 may be included with these components.

As another example, sensor layer 406 is not limited to using piezo electric films or elements, and may be implemented using any type of device and/or element that is capable of generating a signal that varies over time as the force on sensor layer 406 changes over time in response to an impact.

As an example, piezo resistive elements also may be used. These types of elements do not take the form of films but are elements which may have a change in electrical resistance when a force is applied.

Figure 5:
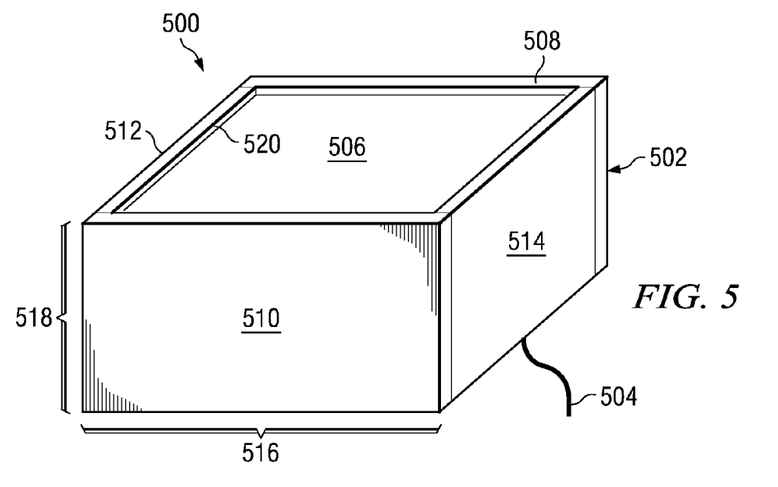
FIG. 5 is a diagram of a dynamic force sensor in accordance with an advantageous embodiment.

Turning now to FIG. 5, a diagram of a dynamic force sensor is depicted in accordance with an advantageous embodiment. In this example, dynamic force sensor 500 is an example of a dynamic force sensor that may be used to implement a dynamic force sensor in dynamic force sensors 108 in FIG. 1. More specifically, dynamic force sensor 500 is an example of one implementation of dynamic force sensor 400 in FIG. 4. In this example, dynamic force sensor 500 is a piezo electric force transducer.

Dynamic force sensor 500 has housing 502, which contains various components for detecting changes in force over time. Connector 504 may be connected to a data processing system, such as data processing system 300 in FIG. 3. Surface 506 is the surface on which force may be measured as hail stones impact surface 506.

Housing 502 includes panels 508, 510, 512, and 514. In these examples, these panels take the form of metal plates. Panels 508, 510, 512, and 514 may be around ⅛ inches thick. These panels may be made of aluminum. Of course other materials may be used depending on the particular implementation. For example, steel, plastic, or some other suitable material may be used for panels 508, 510, 512, and 514. In this example, panel 510 has a length of around four inches in section 516, and a length of around 2.1 inches in section 518. The other panels have similar dimensions.

As can be seen, in this example, panels 508, 510, 512, and 514 protrude above surface 506. This design may prevent oblique impacts from damaging surface 506. Further, sealant may be applied around perimeter 520 around surface 506 at the edges meeting panels 508, 510, 512, and 514. The sealant may prevent moisture from entering housing 502.

Figure 6:
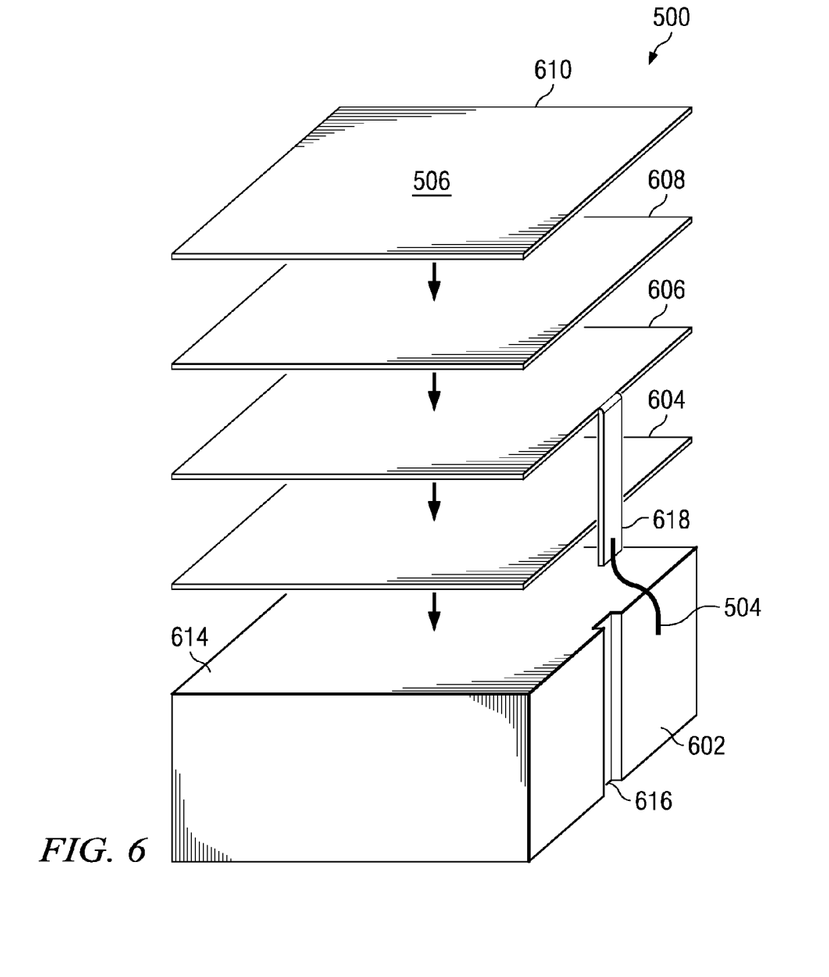
FIG. 6 is an exploded view of a portion of a dynamic force sensor in accordance with an advantageous embodiment.

With reference now to FIG. 6, an exploded view of a portion of a dynamic force sensor is depicted in accordance with an advantageous embodiment. In this example, dynamic force sensor 500 is illustrated without panels 508, 510, 512, and 514.

Dynamic force sensor 500 in FIG. 5 includes base block 602, adhesive transfer tape 604, piezo electric film 606, adhesive transfer tape 608, protective sheet 610, and connector 504. In this example, base block 602 may have dimensions of around four inches by around four inches by two inches. Base block 602 should be sufficiently stiff to prevent bending motions from inducing spurious signals due to in-plane strains in the force sensing element such as piezo electric film 606. In other words, base block 602 is sufficiently stiff to only detect forces caused by an object striking dynamic force sensor 500. Base block 602 may be made of various materials, such as, for example, aluminum, steel, plastic, or some other suitable material. Of course, any other material that may provide a base of support for dynamic force sensor 500 also may be used.

In these examples, adhesive transfer tapes 604 and 608 have adhesive on both sides. Adhesive transfer tape 604 may be used to secure piezo electric film 606 to surface 614 of base block 602. Adhesive transfer tape 608 secures protective sheet 610 to piezo electric film 606. Protective sheet 610 forms surface 506. Protective sheet 610 provides a protective layer over piezo electric film 606. Protective sheet 610 may prevent damage from occurring to piezo electric layer 606, while permitting piezo electric layer 606 to detect dynamic forces that may occur in response to an impact from a hail stone.

The dimensions of adhesive transfer tape 604, piezo electric film 606, adhesive transfer tape 608, and protective sheet 610 are around four inches wide by four inches deep. In this example, piezo electric film 606 may be implemented using a metallized piezo film sheet having part number 3-1004347-0, which is available from Measurement Specialties, Inc. Of course, any type of piezo electric film may be used that is capable of measuring the applied dynamic force sufficiently rapidly to resolve the peak force or any other features associated with the dynamic force history.

In this example, protective sheet 610 is a mylar protective sheet. Adhesive transfer tapes 604 and 608 may be implemented using 3M adhesive transfer tape 9458, which is available from 3M Company. This type of tape in around 0.001 inches thick and provides good adhesion to various components.

In these examples, base block 602 includes channel 616, which is shaped to allow lead 618 and piezo electric film 606 to fit within channel 616. Connector 504 is connected to lead 618 to provide connections to a data processing system to detect changes in force. These changes in force generate electric signal through lead 618. The voltage may change in a manner that is directly proportional to applied force on piezo electric film 606 in response to impacts on protective sheet 610.

The illustration of dynamic force sensor 500 in FIGS. 5 and 6 are not meant to imply limitations on the manner in which dynamic force sensors may be implemented. This illustration is provided as one manner in which a dynamic force sensor may be implemented. For example, other dynamic force sensors may have other shapes other than that shown for base block 602. Additionally, force sensing elements other than piezo electric film may also be used. For example, piezo resistive elements or pressure-sensitive films may be used in other embodiments.

Additionally, other components may be used other than those illustrated. For example, instead of using adhesive transfer tape, an adhesive may be sprayed onto different components to connect protective sheet 610 to piezo electric film 606 and to connect piezo electric film 606 to surface 614 of base block 602.

Figure 7:
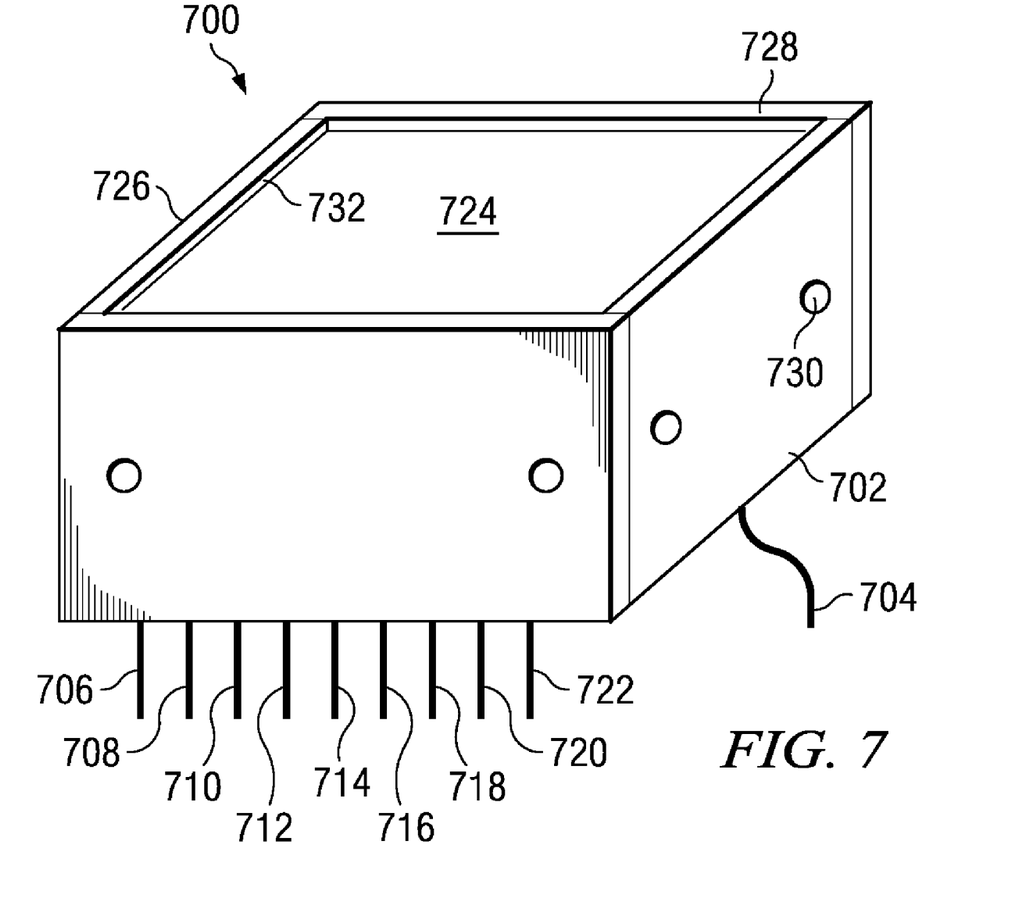
FIG. 7 is a diagram of a dynamic force sensor in accordance with an advantageous embodiment.

With reference now to FIG. 7, a diagram of a dynamic force sensor is depicted in accordance with an advantageous embodiment. In this example, dynamic force sensor 700 is similar in construction to dynamic force sensor 500 in FIG. 5. In particular, dynamic force sensor 700 is an example of another implementation of dynamic force sensor 400 in FIG. 4.

Dynamic force sensor 700 also includes additional sensors that may be used to measure pressure at the center of an impact and pressure at other areas. These sensors may allow a measure of total force over an area to obtain pressure readings. With these sensors, an estimate and/or calculation of the size of an object causing the impact can be made.

In this illustrative example, dynamic force sensor 700 includes housing 702. This housing contains the various components for detecting changes in force and pressure over time. Connector 704 along with connectors 706, 708, 710, 712, 714, 716, 718, 720, and 722 may be connected to a data processing system such as data processing system 300 in FIG. 3. These connectors may lead to sensors within one or more sensor layers located in housing 702.

Surface 724 is the surface on which force and pressure may be measured as objects, such as hail stones, impact surface 724. Housing 702 also includes panels 726, 728, 730, and 732. Panels 726, 728, 730 and 732 may be attached to base block 800 in FIG. 8 using fasteners such as, for example, screws, rivets, or other suitable fasteners.

Figure 8:
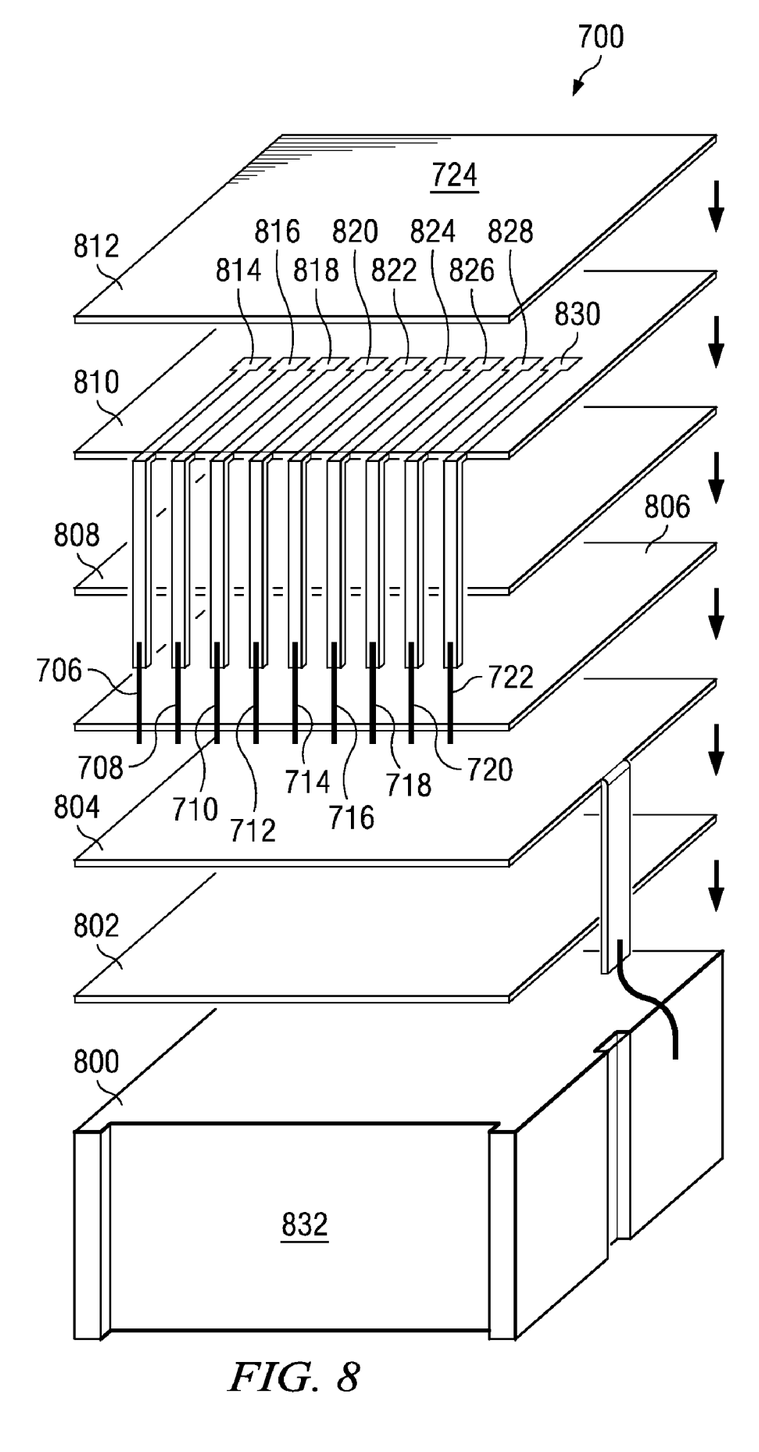
FIG. 8 is a diagram of an exploded view of a portion of a dynamic force sensor in accordance with an advantageous embodiment.

With reference now to FIG. 8, an exploded view of a portion of a dynamic force sensor is depicted in accordance with an advantageous embodiment. In this example, dynamic force sensor 700 is illustrated without panels 726, 728, 730, and 732. In this illustrative example, dynamic sensor 700 includes base block 800, adhesive transfer tape 802, piezo electric film 804, adhesive transfer tape 806, protective sheet 808, adhesive transfer tape 810, and protective sheet 812.

Additionally, piezo electric elements 814, 816, 818, 820, 822, 824, 826, 828, and 830 may be placed on transfer tape 810. These piezo electric elements may be smaller versions of piezo electric film 804. These elements may be formed, for example, without limitation, from a single film by cutting, etching, or otherwise dividing a film to form the elements.

In this example, piezo electric elements 814, 816, 818, 820, 822, 824, 826, 828, and 830 form one sensor layer while piezo electric film 804 forms another sensor layer. Further, these two layers of sensors may be part of a single sensor layer depending on the implementation.

As with base block 602 in FIG. 6, base block 800 is made of some suitable material such that only impact forces may be detected by dynamic force sensor 700. Base block 800 is constructed such that impacts on dynamic force sensor 700 minimize and/or eliminate any bending motions that may cause spurious signals or undesirable signals. These spurious or undesirable signals may be caused by in-plane strains on piezo electric film 804 or the piezo electric elements if base block 800 bends.

As can be seen in this example, leads 706, 708, 710, 712, 714, 716, 718, 720, and 722 may be connected to piezo electric elements 814, 816, 818, 820, 822, 824, 826, 828, and 830. In this example, these leads may lie within channel 832 in base block 800. These leads may be covered with tape and then channel 832 may be filled with sealant to protect against water intrusion.

The illustration of the particular implementations for the dynamic force sensors in FIGS. 5, 6, 7, and 8 are not meant to imply physical or architectural limitations to a manner in which other advantageous embodiments may be implemented. For example, adhesive transfer tape 604, adhesive transfer tape 608, adhesive transfer tape 802, adhesive transfer tape 806, and adhesive transfer tape 810 may be a full sheet of adhesive as illustrated in the figures. In yet other advantageous embodiments, a full sheet may not be needed. In other advantageous embodiments, the adhesive tape may be present only around the perimeter edges of the piezo electric films. In other words, these adhesive tapes do not have to cover the entire area of the sensor.

Figure 9:
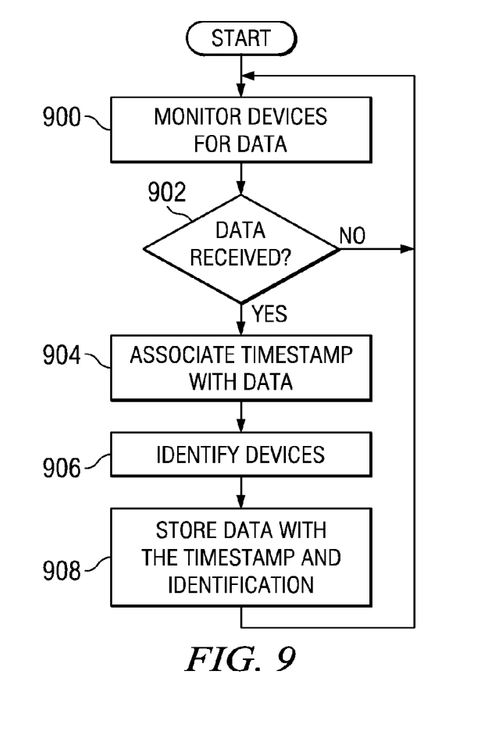
FIG. 9 is a flowchart of a process for collecting hail storm data in accordance with an advantageous embodiment.

With reference now to FIG. 9, a flowchart of process for collecting hail storm data is depicted in accordance with an advantageous embodiment. In this example, the process in FIG. 9 may be implemented in a data processing system, such as data processing system 300 in FIG. 3.

The process begins by monitoring devices in the impact test system for data (operation 900). These devices may include, for example, dynamic force sensors, an atmospheric instrument system, a video camera, and other suitable devices. A determination is made as to whether data has been received from any of the devices (operation 902). If data has not been received, the process returns to operation 900 to continue monitoring for data.

When data is received in operation 902, a timestamp may be associated with the data (operation 904). By associating a timestamp with data received from the different devices, correlations and analysis may be made for the different types of data.

For example, force data received from a dynamic force sensor may be correlated and analyzed with a video of a hail stone impacting the dynamic force sensor. This video may be used to identify the orientation of the hail stone. With this type of correlation being possible, an identification of the impact force based on the angle of the hail stone impacting the dynamic force sensor may be made.

The process identifies the devices from which the data has been received (operation 906). This information also may be used to correlate different types of data. For example, an identification of the dynamic force sensor detecting the impact may be used to identify the orientation at which the impact occurred from video generated by a video camera.

The identification may take various forms. For example, the identification may be a numeral, a character, a set of alphanumeric characters, or some other identification scheme that allows for unique identification of different components within the impact test system. The process stores the data with the timestamp and identification (operation 908).

The process then returns to operation 900. In theses examples, the data may be stored in a storage device within the data processing system. In other advantageous embodiments, instead of storing the data in operation 908, the data may be transmitted to a remote location for processing. This data forms impact data in these examples.

Figure 10:
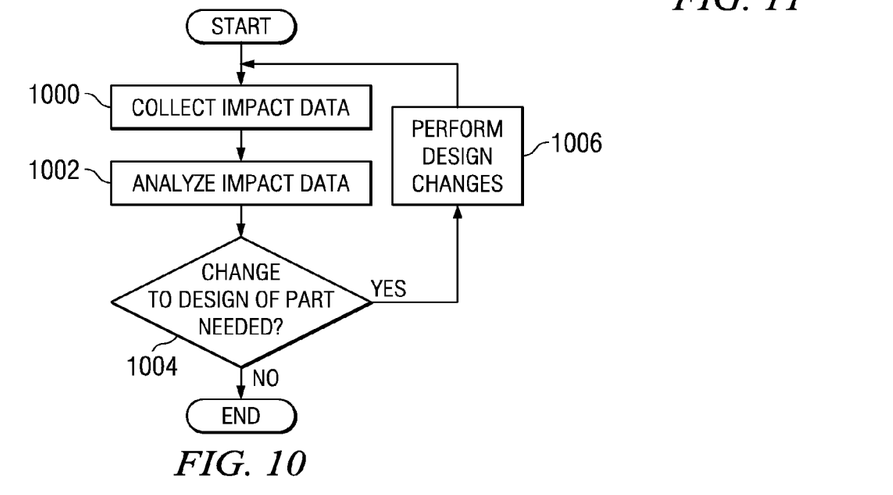
FIG. 10 is a flowchart of a process for analyzing impact data and making design changes in accordance with an advantageous embodiment.

With reference now to FIG. 10, a flowchart of a process for analyzing impact data and making design changes is depicted in accordance with an advantageous embodiment. On or more steps in FIG. 10 may be implemented in a data processing system similar to data processing system 300 in FIG. 3.

The process begins by collecting impact data (operation 1000). The impact data may be collected from an impact test system, such as impact test system 100 in FIG. 1, using the process illustrated in FIG. 9. Further, the collection of impact data in operation 1000 may be collected from multiple impact test system which may be located in the same hail storm or different hail storms. This data may be collected from a single storm or from multiple storms in which impact data is collected. Operation 1000 may be performed by the actual collection of data or by receiving data from impact test systems.

The process analyzes the impact data (operation 1002). Operation 1002 may include various analyses and/or calculations such as, for example, calculating the force generated by hail stones. The process may correlate the force to hail stone size. The hail stone size may be correlated to force based on the video taken of the hail stone. From the video, the size and orientation of impacts may be identified.

Further, analysis of the composition of hail stones also may be made from hail stones collected on site where the impacts occur. This analysis also may include an identification of damage that may or may not have occurred to any test specimens in the impact test system. Operation 1002 may include these and other types of analysis. The specific types of analysis may vary depending on the particular implementation.

A determination is made as to whether a change in the design of the part is needed (operation 1004). This determination may be made in a number of different ways. For example, if no damage occurred to the test specimen, a design change may not be needed. In other advantageous embodiments, some level of deformation or damage may be acceptable without needing a design change.

If a design change is needed, a design change is performed (operation 1006). This operation includes changes to various parameters such as, for example, a type of material and/or the thickness or gauge of the material. Operation 1006 may be performed using the same data processing system or a different data processing system that is specialized for designing parts.

The process then returns to operation 1000 to collect additional impact data with the design change. If a design change is not needed in operation 1006, the process terminates.

Figure 11:
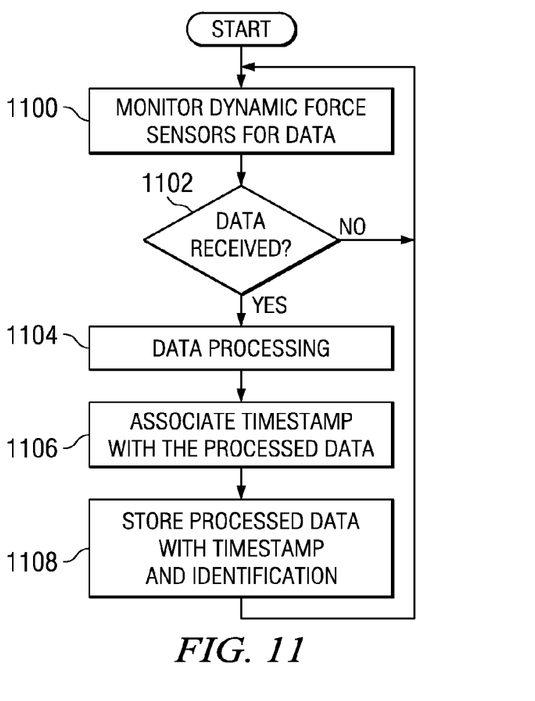
FIG. 11 is a flowchart of a process for detecting impacts on a dynamic force sensor in accordance with an advantageous embodiment.

With reference now to FIG. 11, a flowchart of a process for detecting impacts on a dynamic force sensor is depicted in accordance with an advantageous embodiment. The process illustrated in FIG. 11 may be performed using a dynamic force sensor such as, for example, dynamic force sensor 400 in FIG. 4. This process also may be implemented using a data processing system such as, for example, data processing system 300 in FIG. 3.

The process begins by monitoring the dynamic force sensors for data (operation 1100). The data in these examples is a set of signals that is generated by the dynamic force sensor in response to one or more impacts on the dynamic force sensor. These signals may vary as the force detected by the sensor varies. In these examples, the data varies over time. A determination is made as to whether data has been received (operation 1102). If data has not been received, the process returns to operation 1100.

If data is detected from the dynamic force sensors, the data is then processed (operation 1104). The process may include identifying the force of the impact on the dynamic force sensor. The identification of the pressure over different locations may be used to calculate a size of an object causing the impact. The process also may include identifying the pressure at the center of impact and at different locations over the dynamic force sensor.

The process then associates a time stamp with the processed data (operation 1106). The process then stores the processed data with the time stamp and an identifier (operation 1108). This identifier may identify the sensor from which the signal originated. In other advantageous embodiments, the identifier may identify a particular piezo electric element with any sensor. This identifier may be sequential or random depending on the particular implementation. After operation 1108, the process then repeats, beginning at operation 1100. Pressure is force over an area applied to an object. Through the use of the different elements, the force may be identified over different locations. This information may then be used to obtain the pressure.

In this manner, an impact test system, such as impact test system 100 in FIG. 1, may be used to collect data about hail stones from an in place or in-situ manner that allows for more accurate predictions as to how various components may perform. This type of data collection is more accurate than simulated tests using balls or hail stones formed using man made composites and ice.

In addition, the data collected from impact test system 100 in FIG. 1 also may be used to identify the composition of hail stones. With this information, more accurate man made hail stones may be generated for testing in a laboratory. Additionally, this information also may be used to generate computer based simulations of hail stones to simulate impacts on a modeled component.

The description of the different advantageous embodiments has been presented for purposes of illustration and description, and is not intended to be exhaustive or limited to the embodiments in the form disclosed. Many modifications and variations will be apparent to those of ordinary skill in the art.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. An apparatus comprising:
a sensor layer that generates an electrical signal that varies over time as a force on the sensor layer changes in response to a direct impact of an object falling onto a surface of a protective layer affixed to the sensor layer;

a base, under the sensor layer and affixed directly to the sensor layer by a first adhesive tape, wherein the base resists any bending motion capable of causing one of a spurious signal and an undesirable signal in the sensor layer in response to the direct impact;

a second adhesive tape affixing the protective layer to the sensor layer; and a set of panels surrounding an open space above the surface preventing the object falling onto the surface from impacting the surface at an oblique angle, wherein the object is a hailstone.

2. The apparatus of claim 1, wherein the sensor layer further comprises:

a piezo-electric film that generates the electrical signal in response to the direct impact on the surface.

3. A method for measuring force, the method comprising:

connecting a data processing system to a sensor layer;

affixing a protective layer to the sensor layer by a first adhesive tape;

affixing a base under and directly to the sensor layer by a second adhesive tape, wherein the base resists any bending motion capable of causing one of a spurious signal and an undesirable signal in the sensor layer in response to direct impact of a hailstone falling onto a surface of the protective layer;

preventing the hailstone from impacting the surface of the protective layer at an oblique angle by surrounding an open space above the surface with a set of panels;

responsive to the direct impact on the surface by the hailstone, generating, by the sensor layer, a signal that varies as the force of the impact varies, wherein the sensor layer comprises a sensor configured to generate the signal;

responsive to generating the signal, sending the signal to the data processing system connected to the sensor layer; and responsive to sending the signal to the data processing system, identifying, by the data processing system, a plurality of force data over a time as the signal varies over the time.

4. The method of claim 3, wherein the force data includes a force value, a time stamp, an identifier, a number of pressure values from the direct impact over different areas of the surface of the protective layer, and a size of the hailstone.

5. An apparatus comprising:

a piezoelectric layer that generates an electrical signal in response to a direct impact of a hailstone on a surface of a protective layer on top of the piezoelectric layer and between the direct impact and the piezoelectric layer; and a base, under the piezoelectric layer adhered directly to the sensor layer by a first adhesive tape, wherein the base resists any bending motion capable of causing one of a spurious signal and an undesirable signal in the sensor layer in response to the direct impact.

6. The apparatus of claim 5 further comprising:

a second adhesive tape affixing the protective layer to the piezoelectric layer; and a set of panels surrounding an open space above the surface preventing the hailstone from impacting the surface at an oblique angle.

* * * * *